United States Patent Office 3,826,627
Patented July 30, 1974

3,826,627
DECORATIVE COMPOSITE ARTICLES
Michael J. Pryor, Woodbridge, and James M. Popplewell, Guilford, Conn., assignors to Olin Corporation
Continuation-in-part of application Ser. No. 78,899, Oct. 7, 1970, now Patent No. 3,676,292. This application Mar. 6, 1972, Ser. No. 231,834
Int. Cl. B32p 3/02, 3/06, 3/20
U.S. Cl. 29—195                                    7 Claims

ABSTRACT OF THE DISCLOSURE

The present invention relates to a decorative composite article having a decorative portion and comprising at least one first metal component and a second metal component of different composition from the first metal component bonded thereto wherein the first component has on its surface an aluminum oxide layer. The decorative pattern of the composite article is further coated with a glass or ceramic.

---

This application is a continuation-in-part of co-pending application Ser. No. 78,899, filed Oct. 7, 1970, now U.S. Pat. No. 3,676,292.

The present invention relates to metal composites and particularly to metal composites wherein at least one of the metal components is a copper base alloy and wherein at least one cladding component of the composite is in part removed to expose the underlying metal component in order to provide a pattern.

It is well known to employ aluminum and copper alloys in environments where a decorative and pleasing appearance is desired. For example, aluminum and copper alloys are frequently employed in hand railings, grill work, and paneling wherein the aforementioned aesthetic appearance is highly desirable.

It is also well known that aluminum and copper base alloys rapidly tarnish in most atmospheres to produce oxides and compounds of aluminum and copper which detract from the aesthetic appearance thereof and therefore require mechanical or chemical cleaning to restore their pleasing appearance. Various coatings of paints or lacquers, and in the case of aluminum and its alloys enamels and glasses, may be applied to the surface of these materials in order to provide tarnish and oxidation resistance. However, these coated materials frequently have poor metal to coating bond strength and the paints and lacquers poor durability. The poor bond strength leads to spalling of the coating thereby exposing the underlying metal surface which leads to selective corrosive attack of the metal at the exposed areas. It is therefore highly desirable to provide a high strength bond between copper and aluminum alloys and a glass or ceramic coating in order to prevent the aforementioned spalling and flaking of the coating.

As aforementioned the decorative appearance of aluminum and copper alloys is well known in the art and hence it is highly desirable to produce a composite metal article having on its surface a highly corrosion resistant and securely bonded coating of a glass or ceramic wherein advantage may be taken of the aesthetic appearance of the underlying layer of the composite in order to produce a highly aesthetic pattern. Specifically such a composite is directed to a copper alloy or aluminum bonded to a second metal component wherein a portion of at least one of the components is mechanically or chemically removed in order to provide an aesthetic pattern while simultaneously providing a surface which may be readily and securely bonded to a corrosion resistant glass or ceramic coating.

It is accordingly an object of this invention to provide a composite metal article having a glass or ceramic coating thereon wherein a portion of at least one component is removed in order to provide a pattern.

It is a further object of this invention to provide such a composite metal article wherein at least one component is readily and securely bonded to a glass or ceramic.

Further objects and advantages will appear hereinafter.

The present invention comprises a composite metal article wherein at least one first component is an aluminum or a copper alloy bonded to a second metal component wherein a portion of at least one component is removed in order to form a pattern with the other component. The decorative area of the composite is further coated with a glass or ceramic coating.

The copper alloy component is a copper base alloy comprising from 2 to 12% aluminum, up to 35% zinc and preferably from .001 to 3% silicon, balance essentially copper. The aluminum may be a commercial purity aluminum or an aluminum alloy.

The second metal component is of a dissimilar metal of copper, other copper base alloys which may also contain at least 2.0% aluminum and up to 35% zinc, stainless steels and other aluminum materials including commercial purity aluminium and nickel base alloys.

The process of the present invention comprises bonding of the first component material to the second component material, forming a pattern in at least one of the components, and coating of at least the patterned surface of the composite with a glass or ceramic.

Figure 1:
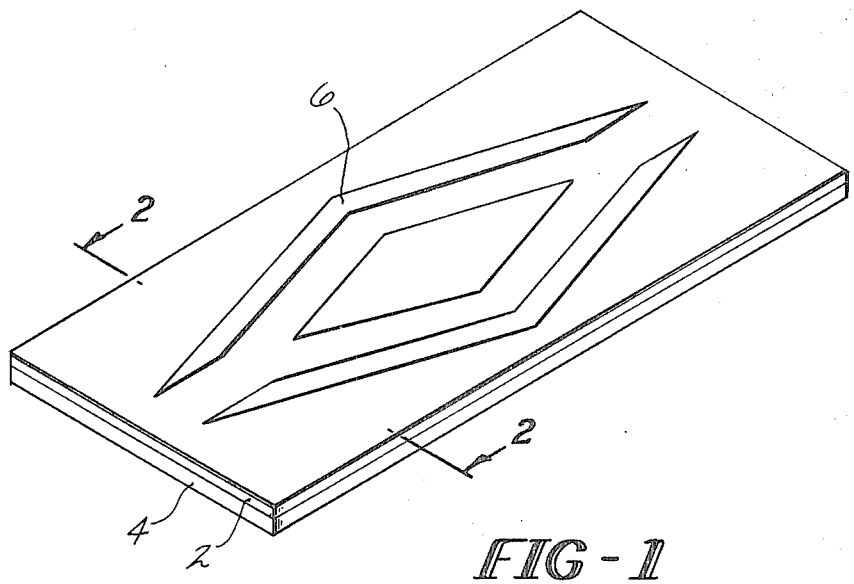
FIG. 1 is a perspective view of the composite metal article of the present invention showing the pattern thereon.

In one embodiment of the present invention, as shown in FIG. 1, a first aluminum or copper base alloy component 2 is bonded to a second material 4 comprising any suitable dissimilar metal as aforementioned wherein removal of a portion of one component produces the desired aesthetic pattern 6 in combination with the other component.

Figure 2:
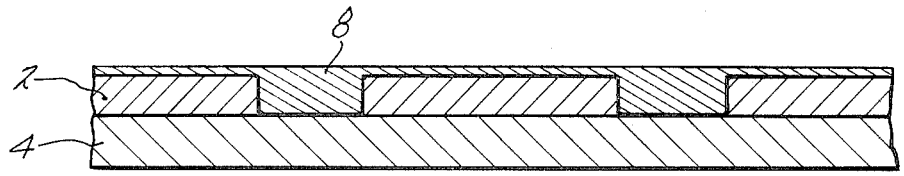
FIG. 2 is a cross sectional view taken through line 2—2 of the composite metal article of FIG. 1 showing a metal component having portions removed in order to form a pattern with the underlying component.
Figure 3:
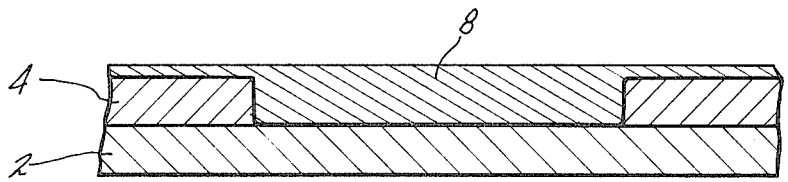
FIG. 3 is a cross sectional view of an alternative embodiment of the present invention.

It is essential that sufficient area of the first component is present, and preferably at least 70% of the total area of the surface upon which the pattern is produced, for contact with the glass or ceramic coating to insure a strong bond. Thus, for example, should Monel comprise the second component, it is preferred that formation of the pattern leaves sufficient area of the first component to comprise at least 70% of the total surface area upon which the pattern is produced, as shown in FIG. 2. Conversely, should the Monel component be removed it is preferred that at least 70% of the Monel be removed in order to expose sufficient area of the first component to comprise at least 70% of the total surface area having the pattern thereon, as shown in FIG. 3. Thus, it is seen that the pattern formation is preferably dependent upon which component is being removed in order to form a pattern with the other component so as to achieve the aforementioned surface area of least 70% comprising the first component material.

Bonding of the copper alloy first material to the second material may be readily accomplished in any suitable manner such as by rolling the composite metal strip together but preferably in accordance with, for example, U.S. Pat. No. 3,381,364 in the case of bonding the copper alloy to other copper material.

Portions of one component are then removed in order to form the desired pattern 6. Any suitable method of removal is contemplated such as machining, or chemical etching by an acid such as nitric acid and masking off of the areas which are not to be removed.

Following the aforementioned pattern formation the patterned surface is coated in any suitable manner by the glass or ceramic such as, for example, coating the composite with dry glass or ceramic powder or spraying onto the surface of the composite a suspension of powdered glass or ceramic in a suitable binder. The coated composite is then heated to a temperature of above 200° C. and generally from 200 to 900° C., depending upon the particular glass or ceramic employed, for a period of time to melt the glass or ceramic and form an adherent layer 8 of these materials.

Figure 4:
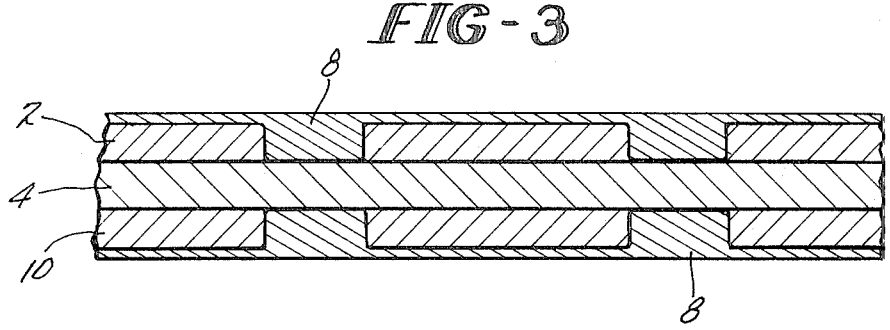
FIG. 4 is a cross-sectional view of the composite metal article of the present invention showing a pattern on opposing sides of a composite.

As shown in FIG. 4 a pattern may be present on both sides of a composite wherein an additional component 10 is employed. In this embodiment the additional component may be either of a first or second component material so long as either the additional component 10 or component 4 comprises a first component material in order that the requisite oxide film may be formed for bonding to a glass or ceramic coating.

A two component composite having a pattern on opposing sides is also contemplated. In this embodiment patterns are present in each component at least one of which is the first component material, which do not overlap the other and in which preferably at least 70% of each exposed surface area comprises a first component material after formation of the pattern.

It is essential that an oxide film consisting essentially of aluminum oxide be produced on the surface of the aluminum or copper alloy component in order to provide for bonding of the composite to a glass or ceramic for corrosion resistance. The oxide is normally produced by heat treating of the composite after application of the glass or ceramic since the heat required to melt the glass or ceramic is generally sufficient to form the oxide. If desired, however, as for example if the use of low melting point glasses or ceramics are contemplated, the composite may be preoxidized by heat treatment before application of the glass or ceramic at a temperature preferably in the range of 200–700° C. either before or after portions of the component 2 are removed in order to form the desired pattern 8.

Naturally, however, if the first component material is exposed only after formation of the pattern then preoxidation must occur following the pattern formation in order to form the requisite oxide film.

The requisite oxide film formed upon the surface of the first component material consists essentially of $Al_2O_3$ which is compact and substantially continuous. This film is adherent to the metal and comprises between 10% and 100% of the total oxide film thickness. In order to insure the requisite film the copper base alloy contains from 2 to 12% aluminum and preferably from 2 to 10% aluminum, up to 35% zinc and preferably from .001 to 3% silicon. The alloy also may contain a grain refining element selected from the group consisting of up to 4.0% iron, up to 1% chromium, up to 0.5% zirconium, up to 1% cobalt and mixture thereof. Various impurities may also be present which do not adversely effect the properties of the glass or ceramic to metal bond of the composite. These impurities include but are not limited to the following: up to 1% nickel, up to 1% manganese, up to 1% tin, up to .5% lead, up to .1% phosphorus and up to .1% arsenic.

The alloys have excellent high temperature oxidation resistance which is provided by the formation of the selective aluminum oxide film and provides for an excellent bond to the glass or ceramic coating.

As aforementioned, other copper base alloys as well as high purity copper may be employed as a metal component of the composite wherein the oxide film is not required for bonding, i.e., the first component forms the requisite oxide film, such as various brasses and bronzes of a different composition than the oxide coated material in order to provide a color contrast and thereby a visual pattern upon the composite. Such alloys include, but are not limited to the following alloying addition: zinc up to 4%, iron up to 5%, tin up to 8%, and nickel, cadmium, titanium, tungsten and vanadium from .01 to .5%. These alloys may also contain aluminum, if desired, should the particular alloy color be desirable.

Naturally, also smaller amounts of elements may be present in this component as impurities such as previously discussed. If an additional copper base alloy component is not employed an iron alloy containing major proportions of iron such as the stainless steels may be readily employed dependent upon the desired aesthetic effect provided. Typical iron base alloys which may be employed include but are not limited to the following: alloys of the iron chromium family, iron nickel family, and the iron nickel-chromium family. Typical alloying constituents include but are not limited to the following: carbon, aluminum, titanium, silicon, phosphorus, sulfur, chromium, nickel, zirconium and zinc.

Nickel base alloys such as Monel may also be employed if desired.

Naturally, the present invention also contemplates multiple cladding, i.e., providing three or more components bonded together. Thus, in a three component system, for example, a pattern may be produced on opposing sides of the composite article as aforementioned.

Thus, it is seen that the present invention provides for a composite article having excellent mechanical properties, corrosion resistance, and a pleasing pattern thereon which is highly desirable in environments wherein a decorative appearance is desired.

This invention may be embodied in other forms or carried out in other ways without departing from the spirit or essential characteristics thereof. The present embodiment is therefore to be considered as in all respects illustrative and not restrictive the scope of the invention being indicated by the appended claims, and all changes which come within the meaning and range of equivalency are intended to be embraced therein.

What is claimed is:

1. A composite article consisting essentially of:
   (A) at least one first metal component comprising a material selected from the group consisting of copper alloys containing from 2 to 12% aluminum, from .001 to 3% silicon, and up to 35% zinc, aluminum and aluminum alloys,
   (B) at least one second metal component of different composition from said first metal component bonded to said first metal component,
   (C) at least one decorative pattern present in at least one of said components, said decorative pattern extending throughout the thickness of said component so as to expose the other of said components,
   (D) an oxide layer formed over substantially the entire exposed surface of said composite provided by said first component, said oxide layer comprised of alumina in an amount of from 10 to 100% of its total thickness, and
   (E) a coating selected from the group consisting of glasses and ceramics which is in a glass or ceramic-to-metal bond and is formed over substantially the entire surface of said composite having said decorative pattern.

2. A composite as in Claim 1 wherein said first component comprises at least 70% of the surface area of said surface of said composite having said decorative pattern.

3. A composite as in Claim 2 wherein said second metal component comprises a material selected from the group consisting of aluminum, aluminum alloys, stainless steels, nickel base alloys and copper and copper alloys.

4. A composite as in Claim 3 wherein said first component is said copper alloy.

5. A composite as in Claim 3 wherein said first component is selected from the group consisting of aluminum and its alloys.

6. A composite as in Claim 4 wherein said composite comprises three components having said first component and said second component bonded on opposing sides of said second component.

7. A composite as in Claim 1 wherein said copper alloys contain from 2 to 10% aluminum.

References Cited

UNITED STATES PATENTS

| | | | |
|---|---|---|---|
| 3,249,478 | 5/1966 | Brevik | 156—3 |
| 3,381,364 | 7/1968 | Winter | 29—472.3 |
| 3,677,828 | 7/1972 | Caule | 156—3 |
| 3,402,043 | 9/1968 | Smith | 75—162 |

FOREIGN PATENTS

| | | | |
|---|---|---|---|
| 513,231 | 2/1955 | Italy | 161—113 |
| 643,457 | 6/1962 | Canada | 156—3 |

OTHER REFERENCES

R. H. Dalton, Glass-to-Metal Joints, Product Engineering, April 26, 1965, pp. 62–71.

J. H. Partridge, Glass-to-Metal-Seals, The Society of Glass Technology, 1949.

GEORGE F. LESMES, Primary Examiner

S. S. SILVERMAN, Assistant Examiner

U.S. Cl. X.R.

29—191, 194; 161—113, 116, 117, 119, 196, 413; 117—129